United States Patent [19]

Hellat et al.

[11] Patent Number: 4,679,393
[45] Date of Patent: Jul. 14, 1987

[54] PRESSURE WAVE MACHINE OPERATING AS PRESSURE EXCHANGER, IN PARTICULAR FOR USE AS THE HIGH-PRESSURE COMPRESSOR FOR GAS TURBINES

[75] Inventors: Jaan Hellat, Rütihof-Baden; Jakob Keller, Dottikon, both of Switzerland

[73] Assignee: BBC Brown, Boveri & Company, Limited, Baden, Switzerland

[21] Appl. No.: 780,202

[22] Filed: Sep. 26, 1985

[30] Foreign Application Priority Data

Sep. 28, 1984 [CH] Switzerland ............... 4670/84

[51] Int. Cl.⁴ ............................................. F02C 3/02
[52] U.S. Cl. ................................ 60/39.45; 417/64
[58] Field of Search ............ 60/39.45 A, 39.45 R; 417/64; 123/559

[56] References Cited

U.S. PATENT DOCUMENTS

| | | |
|---|---|---|
| 2,959,344 | 11/1960 | Niedermann . |
| 2,970,745 | 2/1961 | Berchtold ............... 60/39.45 A |
| 3,012,708 | 12/1961 | Berchtold et al. .......... 60/39.45 A |
| 3,084,511 | 4/1963 | Klapproth ............... 60/39.45 A |
| 3,159,002 | 12/1964 | Spalding ................. 60/39.45 A |
| 3,206,107 | 9/1965 | Waleffe et al. . |

FOREIGN PATENT DOCUMENTS

| | | |
|---|---|---|
| 1110811 | 2/1962 | Fed. Rep. of Germany . |
| 292906 | 8/1953 | Switzerland . |
| 315430 | 8/1956 | Switzerland . |
| 342796 | 11/1959 | Switzerland . |
| 946959 | 1/1964 | United Kingdom . |

OTHER PUBLICATIONS

Proceedings of the Institution of Mechanical Engineers 1965-66, vol. 180, Part I, No. 18, London P. H. Azoury: "An Introduction to the Dynamic Pressure Exchanger".

Primary Examiner—Louis J. Casaregola
Assistant Examiner—Donald E. Stout
Attorney, Agent, or Firm—Burns, Doane, Swecker & Mathis

[57] ABSTRACT

A pressure exchanger, preferably usable as a high-pressure compressor for gas turbine installations, has a multiplicity of coaxial cell rotors which can be driven in the same direction, and a central pressure exchanger combustion chamber located within the innermost cell rotor. Driving gases generated in the combustion chamber flow through the cell rotors in series from inside to outside and can be expanded as low pressure driving gases in the low pressure part of the turbine. The air to be compressed flows through the cell rotors in series from the outermost cell rotor towards the inside. A part of the air mass flow compressed to the final pressure, which part is greater than the driving gas mass flow, arrives as combustion air in the pressure exchanger combustion chamber; the other part of the air can be used as combustion air for a turbine combustion chamber, which generates high pressure driving gas for the gas turbine. The inlet and outlet cross-sections of the driving gas and air ports in the control casings are so designed that the closing edge of the low pressure air port viewed in the rotational direction of the cell rotor, is located before the closing edge of the low pressure driving gas port.

3 Claims, 8 Drawing Figures

PRESSURE WAVE MACHINE OPERATING AS PRESSURE EXCHANGER, IN PARTICULAR FOR USE AS THE HIGH-PRESSURE COMPRESSOR FOR GAS TURBINES

BACKGROUND AND OBJECTS OF THE INVENTION

The present invention concerns a pressure wave machine operating as a pressure exchanger, in particular for use as the high-pressure compressor for gas turbines.

Pressure wave machines operate either as pressure exchangers or as pressure converters. The latter currently find application mainly as pressure wave superchargers for internal combustion engines. In these, the quantity of compressed air $Q_A$ is equal to the quantity exhaust gas $Q_G$ but post-compression is then used to bring the air to a pressure $p_3$ higher than that of the exhaust gas pressure $p_2$ before the supercharger.

In pressure exchangers (the first mentioned type of pressure wave machines) on the other hand, a quantity $Q_A$ of cold air is brought from an initial pressure $p_1$ to a final pressure which is the pressure $p_2$ of the hot exhaust gases before entry into the pressure exchanger. During the same period of time, the quantity $Q_G$ of the hot exhaust gas is expanded from the initial pressure $p_2$ to the final pressure $p_1$. There is, therefore, only an exchange gas pressure and not a compression of the air beyond exhaust gas pressure $p_2$. The proportion of the enthalpy in the hot exhaust gases (when a pressure exchanger is used in a gas turbine, this would be more appropriately referred to as driving gases) which is not used for additional compression to $p_3$—such as occurs in the pressure converter—is used in a pressure exchanger to compress an additional quantity of air which exceeds the air quantity corresponding to the driving gas quantity $Q_G$. In a pressure exchanger, therefore, the total air quantity $Q_A$ is greater than the driving gas quantity $Q_G$.

The previously used indices of $p_1$, $p_2$ and $p_3$ indicate the pressure level of the exhaust gas and the air using the designation usual for pressure wave machines. The Index 1 applies to the low pressure side of the air and exhaust gas in both the pressure converter and the pressure exchanger. In the case of the pressure exchanger, the Index 2 applies to the high pressure side of both the exhaust gas and the air whereas, although the Index 2 still applies to the high pressure gas in the case of the pressure converter, the Index 3 applies to the high pressure air, this expressing the fact that this pressure $p_3$ is greater than $p_2$ because of the postcompression.

In order to define the location at which the particular pressure is present, further indices U and D are added to the symbols $p_1$ and $p_2$, U and D standing for "upstream" and "downstream" of the pressure wave machine. This is not necessary in the case of the highest pressure occurring in a pressure converter, $p_3$, because it appears alone and is unambiguously defined.

These extra indices U and D therefore refer to the inlet and outlet side for each of the two media air and exhaust gas. In consequence, $p_{1U}$ is the pressure of the air entering the pressure wave machine (low pressure air), $p_{1D}$ is the pressure of the expanded exhaust gas at outlet (low pressure gas), $p_{2U}$ is the exhaust gas before the pressure wave machine and, in the case of the pressure exchanger, $p_{2D}$ is the air pressure after the pressure wave machine (high pressure gas and high pressure air, respectively). In the case of the pressure converter, the supercharged pressure $p_3$ appears in place of $p_{2D}$. Since, for both pressure exchangers and pressure converters, $p_{1U}$ is approximately equal to $p_{1D}$ and $p_{2U}$ is approximately equal to $p_{2D}$ in the case of the pressure exchanger whereas, in the case of the pressure converter, $p_{2U}$ is less than $p_3$, the two types of pressure wave machines can be characterised by the pressure relationships and the air and exhaust gas quantity relationships as shown below, if the indices U and D are omitted and, for both types, the symbol $p_3$ is used instead of $p_{2D}$:

| Pressure converter | Pressure exchanger |
|---|---|
| $p_1 < p_2 < p_3$ | $p_1 < p_2 = p_3$ |
| $Q_G = Q_A$ | $Q_G < Q_A$ |

In the case of the pressure converter, the quotient $p_3/p_2$ is a measure of the efficiency but in the case of the pressure exchanger, the corresponding quantity is the quotient $Q_A/Q_G$. The pressure exchanger is a constant pressure, pressure wave machine and, as such, cannot be considered for conventional applications, i.e. as a pressure wave supercharger, because it supplies surplus compressed air. This property, on the other hand, makes it particularly suitable for use as the high pressure compressor in gas turbines. Since, like conventional gas turbine compressors, it normally operates only at a fixed speed and load, i.e. over a fixed temperature range, the pressure wave process can be precisely matched to this operating condition. Under these conditions, there are no wandering waves which have to be captured by the known pockets in the air and gas casings. The scavenging zone and the charging zone in the rotor cells can be designed in a practically ideal manner because only one expansion wave occurs from the exhaust gas opening edge to the air opening edge and only one compression wave occurs from the exhaust gas closing edge to the air closing edge.

SUMMARY OF THE INVENTION

The present invention arose from the objective of producing a pressure wave machine with a cycle for constant pressure supercharging, the pressure wave machine being particularly suitable as the high pressure compressor part of a stationary gas turbine instead of the conventional axial or centrifugal compressor and in which the geometrically determining parts of the control edges, control ducts and the cell rotor are optimised for a specified steady load condition. In a preferred embodiment, the combustion chamber is located coaxially within the high pressure stage of the pressure wave machine. By this means, extremely short and low-loss air and gas ducts are achieved.

The invention is described below using embodiment examples of constant pressure, pressure wave machines (referred to for short as pressure exchangers in what follows) shown in the drawing, in which embodiment examples the gas and air ducts, the position of their opening and closing edges relative to one another and their dimensions are designed in accordance with the present invention. In addition, the concept mentioned, which is particularly advantageous for interaction with a gas tubine and which has a coaxial combustion chamber located within a multi-stage pressure exchanger, is described.

DETAILED DESCRIPTION OF PREFERRED EMBODIMENTS OF THE INVENTION

Figure 1:
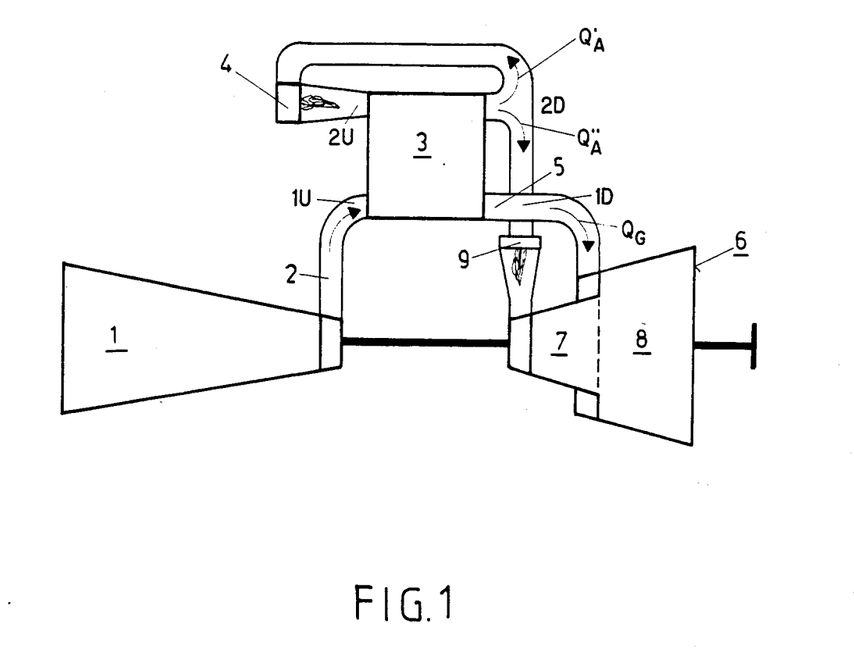
FIG. 1 shows a diagrammatic arrangement of a gas turbine installation with a pressure exchanger as the high pressure compressor, a conventional axial compressor as the low pressure part and a two-stage turbine, FIG. 2 diagrammatically shows an axial section through a multi-stage pressure exchanger for a gas turbine installation with a combustion chamber located centrally within the pressure exchanger, FIGS. 3 and 4 diagrammatically show cross-sections normal to the axis through the pressure exchanger shown in FIG. 2, FIG. 5 diagrammatically shows the arrangement and dimensions of the ports for a first pressure exchanger cycle according to the invention.

In the gas turbine installation shown diagrammatically in FIG. 1, a low pressure compressor 1 delivers precompressed air via a low pressure air duct 2 into a pressure exchanger 3. In order to avoid the losses associated with a mechanical drive, the rotor cells of this pressure exchanger will be advantageously provided with cell walls located obliquely to the rotor axis or with special blading so that the drive occurs directly by deflection of the gas flow.

At 1U, the low pressure air enters the pressure exchanger 3 and it emerges at 2D compressed to the pressure of the driving gas entering at 2U. As stated at the beginning, the pressure exchanger delivers an air quantity which is larger than the driving gas quantity, which enters at high pressure at 2U and gives up energy. This means that the pressure exchanger compresses more air than it requires for generating the driving gas quantity, by means of which the air quantity emerging at 2D is compressed from the pressure $p_1$ at the entry 1U to the driving gas pressure $p_2$ at 2D. This can be expressed, using the symbols mentioned at the beginning of $Q_G$ and $Q_A$ for the driving gas and air quantities and using $Q_A'$ for the air quantity for generating the driving gases and $Q_A''$ for the freely available air quantity, by $Q_G < Q_A = Q_A' + Q_A''$. The two partial air quantities $Q_A'$ and $Q_A''$ are indicated in FIG. 1 by the corresponding arrows.

$Q_A'$ enters a pressure exchanger combustion chamber 4 in which the fuel is burnt at a constant high temperature. The combustion chamber 4 and the pressure exchanger 3 are therefore operated at constant operating conditions and high driving gas temperature.

The driving gas quantity $Q_G$ is expanded in the pressure exchanger 3 from its inlet pressure $p_2$ at 2U to its outlet pressure $p_1$ at 1D and then passes through a low pressure driving gas duct 5 into the low pressure stage 8 of a two-stage gas turbine 6, where it is mixed with the partially expanded high pressure driving gases coming from the high pressure stage 7. These high pressure driving gases are generated by the combustion of fuel with the partial air quantity $Q_A''$ in a turbine combustion chamber 9 and are then supplied to the high pressure stage 7.

An advantage of pressure exchangers as the air compressor in gas turbine installations lies mainly in the fact that they are self-cooled because hot driving gases and comparatively cold air blow alternately through their rotor cells. The cell walls are heated in this process only to an average temperature which is substantially lower than the temperature of the driving gases. The driving gas temperatures can, therefore, be substantially higher than the permissible limiting temperatures of the materials used for the rotor of the pressure exchanger. It is therefore possible, using high temperature materials for the rotor, to burn the fuel in the pressure exchanger combustion chamber 4 at the stoichiometric fuel/air ratio with optimum efficiency. It is only the relatively small proportion of fuel supplied to the turbine combustion chamber 9 which must be burnt with the usual large excess of air in order to allow for the permissible limiting temperature of the materials of the turbine blading continuously subject to high temperatures.

In the gas turbine installation concept shown in FIG. 1, the gas turbine 6 drives only the low pressure compressor 1 and a generator (not shown), if the idling power is ignored. The lower efficiency relative to the driving gas $Q_G$ coming from the pressure exchanger and caused by the over-stoichiometric combustion in the turbine combustion chamber 9, therefore, only affects a partial process of the gas turbine. This partial process can be further reduced, for a given generator power, if the compression of the total air supply of the turbine is provided by a—preferably—multi-stage pressure exchanger. In this case, the turbine process with the lower efficiency only affects the power necessary for the generator and internal drives because the low pressure compressor also disappears.

Figure 2:
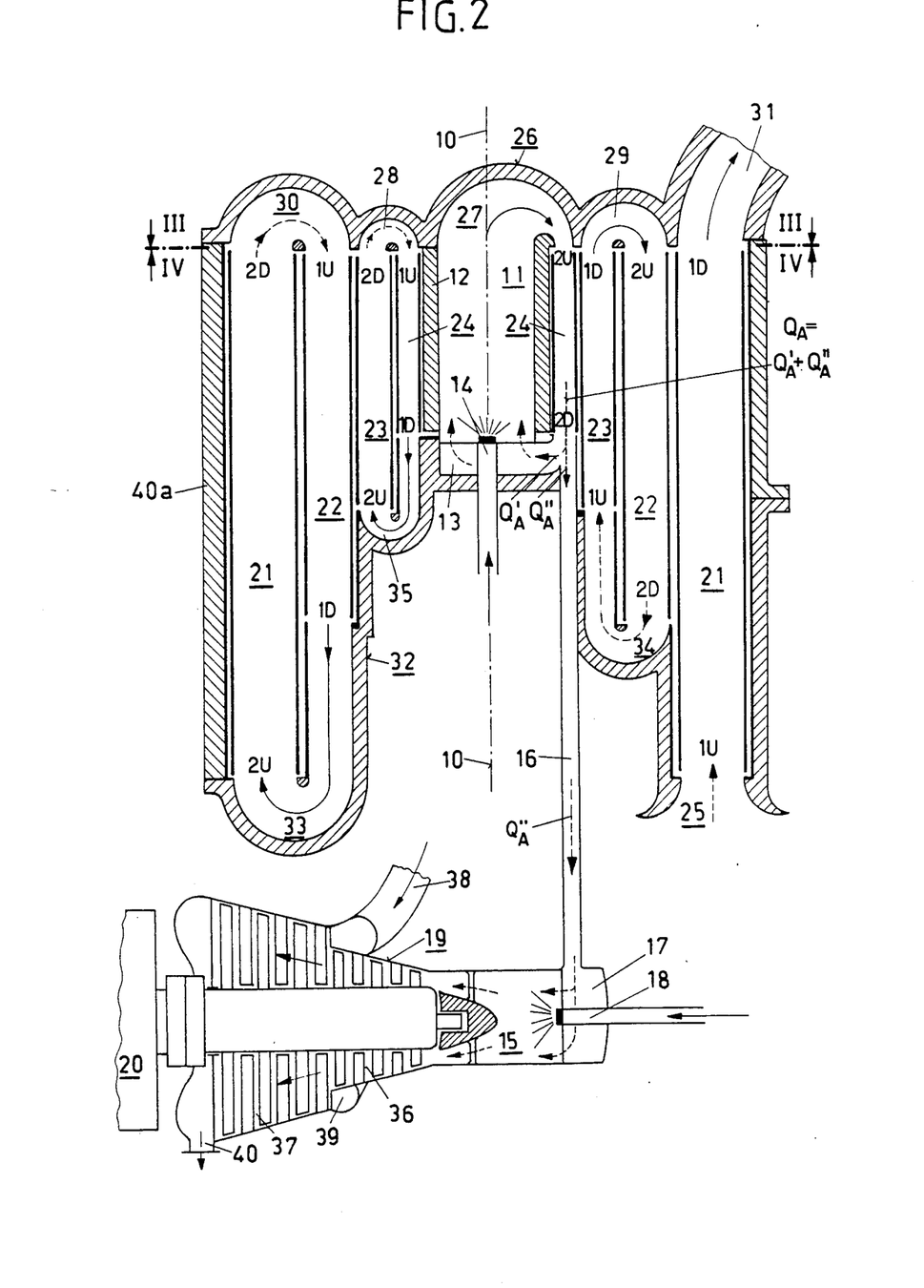
Figure 3:
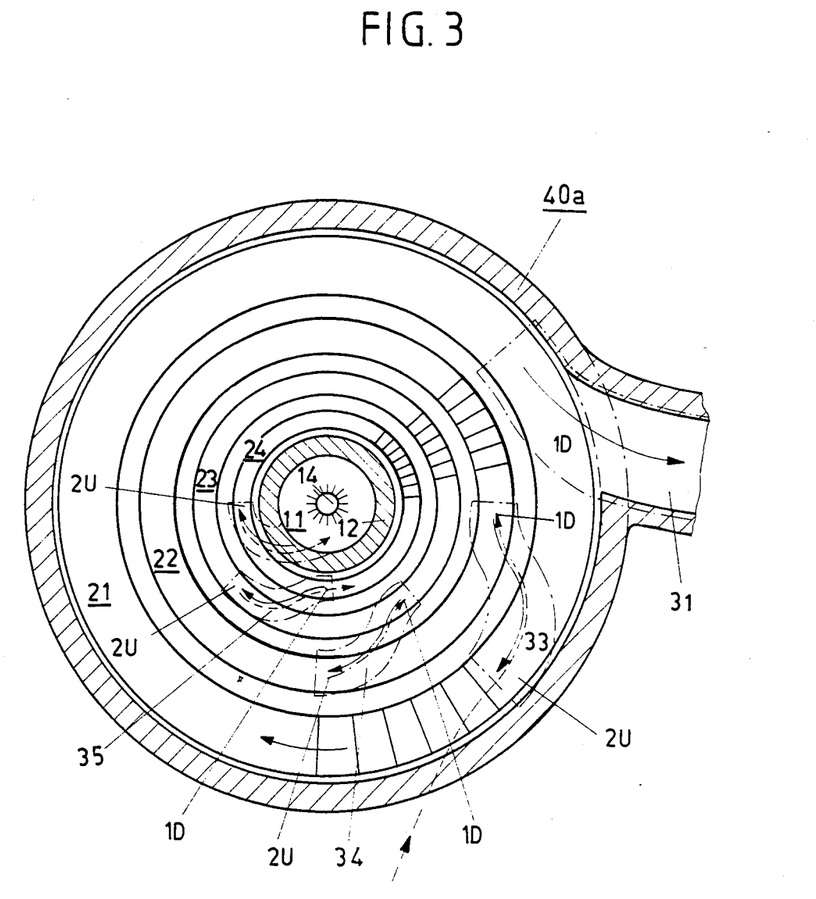
Figure 4:
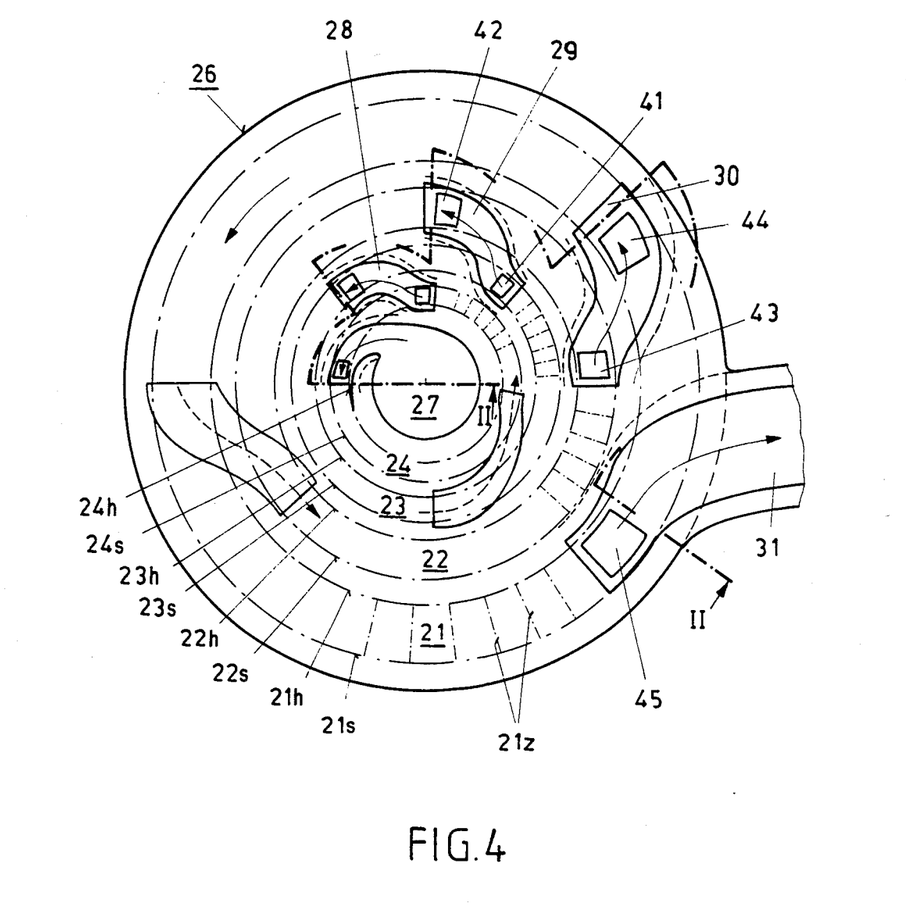

FIGS. 2, 3 and 4 show, diagrammatically, an example of such a multi-stage pressure exchanger. This is a four stage arrangement by means of which, for example, a total pressure of ratio 1:16 can be achieved with a pressure ratio per stage of approximately 1:2. This staging, which almost corresponds to adiabatic compression, avoids strong shock waves and the strong increase in entropy associated with it. The lengths and cell widths of the individual rotors would be proportional to their mean radii and the speeds, ideally, inversely proportioned to the average radii of the rotors.

For an assumed electrical power of 100 MW, the radius of the outermost rotor would be approximately 1.5 m in this concept and its speed would be approximately 300 r.p.m. The complete structure would rotate almost as a potential vortex, i.e. a particle which is deflected by the rotor into the next innermost rotor experiences practically no change to its angular momentum. The losses associated with changes to the angular momentum would be very small. Since, as shown later, the boundaries between the media in the rotor cells are very sharp, very favourable small deflection angles of about 60 occur in the two casing parts adjacent to the two rotor faces. Because of the low rotational speeds relative to conventional compressors, the centrifugal forces are also small so that the manufacturing costs are relatively favourable. Compared with classical compressors, smaller flow losses also occur in multi-stage pressure exchangers because of the low Mach numbers and the leakage losses are similarly smaller.

In FIG. 2, 10 indicates the geometrical axis of rotation of the multi-stage pressure exchanger.

A pressure exchanger combustion chamber 11 is located coaxially with it and this is thermally screened by a fire resistant insulating cover 12 against the pressure exchanger coaxially surrounding it. The bottom of the combustion chamber forms a pressure exchanger air chamber 13 through which the air quantity $Q_A'$ flowing from the end stage of the pressure exchanger enters the combustion chamber 11. Fuel at a stoichiometric ratio to $Q_A'$ is injected via a pressure exchanger burner 14 into the centre of the air chamber 13, the resulting combustion generating the driving gases for compressing the air quantity $Q_A$ part of which $Q_A'$, is supplied to the pressure exchanger combustion chamer 11 and part of which $Q_A''$, is supplied to a turbine combustion chamber 15, in fact via a turbine air duct 16 and a turbine air chamber 17, which is penetrated by a turbine burner 18 coaxial with the turbine axis. Corresponding to the permissible driving gas temperature for the blading of the turbine 19, which gives up its power to a generator 20, the fuel is burnt in the turbine combustion chamber 15 with an air quantity which is in excess of the stoichiometric. The turbine combustion chamber is provided as an aligned extension of the turbine casing so that the installation is smaller, more compact, simpler and cheaper than a conventional type with a hot gas casing.

Since, as already mentioned, a relatively small proportion of the fuel is burnt with air in excess of the stoichiometric—compared with a gas turbine with a rigidly coupled compressor—it is quite possible, using the design proposed here to achieve efficiencies approaching those of steam turbine installations. In such an installation, the power is no longer limited by the compressor.

The driving gases generated in the pressure exchanger combustion chamber 11 and whose flow direction is indicated by the full line flow arrows, compress, in four coaxial cell rotors 21, 22, 23 and 24, the air entering at the initial pressure through the air induction duct 25 to a pressure which, in the pressure exchanger air chamber 13, is equal to the pressure of the driving gases at the end of the last, seen in the flow direction of the air, and innermost cell rotor 24, which surrounds the insulating cover 12. These reference numbers are each given in the two sectional diagrams of these rotors, which consist of two parallel lines in each case. The deflection of driving gases from the combustion chamber 11 into the innermost cell rotor 24, from this into the subsequent cell rotor 23, etc. and on into the outermost rotor 21 takes place on the end faces of the two control casings 26 and 32 in the gas transfer ducts 27, 35, 29, 33, this in the order in which the gas expanding in the rotor cells passes through them outwards to the driving gas outlet stub pipe 31. The upper ends of the rotors 21-24 all lie in one plane and their lower ends in various planes because of the differing rotor lengths, for which reason the lower control casing 32 is more complicated than the upper control casing 26. The air entering through the air induction duct 25 and whose flow direction is indicated by the dotted flow arrows is precompressed in the rotor 21, passes from this via a first air transfer duct 30 to further compression in the second rotor 22, from which it passes via a second air transfer duct 34 into the rotor 23 as the third compression stage and finally via a third transfer duct 28 to the final compression in the innermost rotor 24. The final compression of the complete pressure exchange between the driving gas and the air is achieved at the outlet of the air from the rotor 24, i.e. at the location where the air quantity $Q_A$ compressed to the final pressure splits into the first partial air quantity $Q_A'$ for the maintenance of the driving gas generation in the combustion chamber 11 and the second partial air quantity $Q_A''$, which passes via the turbine air duct 16 into the turbine air chamber 17 in order, in the turbine combustion chamber 15, to generate high pressure driving gas by the combustion of a controllable fuel quantity supplied by the turbine burner 18, which high pressure driving gas is led to the high pressure part 36 of the gas turbine. The partially expanded low pressure driving gas flowing from the driving gas outlet stub pipe 31 passes via a connecting duct 38 between the driving gas outlet duct 31 and an entry volute 39 of the gas turbine into the low pressure part 37 of the latter. Only the part of this connecting duct 38 which passes into the inlet volute is shown. The already partially expanded high pressure driving gases mix with the partially expanded low pressure driving gases in the low pressure part 37. After producing work in the turbine 19, the driving gases—expanded to the ambient air pressure or another back pressure—emerge from the exhaust gas stub pipe 40.

FIGS. 3 and 4 show, diagrammatically, the position of the gas transfer ducts corresponding to the section lines III—III and IV—IV in FIG. 2. It follows that FIG. 3 is a plan view on the rotor casing 40a of the pressure exchanger with the rotors 21-24. The position of the gas transfer ducts is here shown dotted, which is intended to indicate that these transfer ducts are located in the upper control casing 26 located above; however, the transfer ducts are here considered as being removed As in FIG. 2, the full flow arrows here represent the flow direction of the driving gases and the dotted flow arrows the flow direction of the air. For simplicity, the emergent cross-sections of the transfer ducts, which are located respectively in the upper and lower control casing 26 and 32, are shown as being coincident and congruent whereas, in fact, they are different with respect to size and position.

A view from the bottom of the same, seen in the direction IV—IV of FIG. 2, is shown in FIG. 4. In this diagram, the outlines of the upper casing 26 of the pressure exchanger are a mirror image because of the opposing projection directions of III—III and IV—IV. This FIG. 4 also shows the section line II—II which corresponds to the representation in FIG. 2. At this point, it should be noted that there is no exact correspondence between FIG. 2, on the one hand, and FIGS. 3 and 4, on the other, in the sense of normal drafting projection. The full flow arrows again refer to the driving gas and the dotted flow arrows to the air.

The chain-dotted circles represent the shroud tubes and hub tubes ($21s$ and $21h$, $22s$ and $22h$, $23s$ and $23h$, $24s$ and $24h$) associated with the rotors. In addition, some cell walls are also shown dotted in each of the rotors in this figure and of these, the cell rotor 21 is indicated by $21c$.

The shape of the gas transfer ducts 27-30 on the base, i.e. in the plane given by the Section IV—IV of FIG. 2, is indicated by the S-shaped curved full lines. At the beginning of these transfer ducts, seen in the flow direction of the rotors indicated by the arrows, is provided an outlet port for the partially expanded gas into the appropriate inner rotor and, at the end of these transfer ducts, is located an inlet port through which this gas enters into the adjacent outer rotor so it can there compress the air flowing through the rotors in the opposite direction and itself further expand in the process. To make the matter easier to see, these ports are indicated in FIG. 4 by 41, 42, 43 and 44 only at the transitions from the rotor 23 into the rotor 22 and between the latter and the outermost rotor 21.

The gas which, in the outermost rotor 21, precompresses from the initial pressure the air entering this rotor through the air induction duct 24, leaves the rotor through the outlet port 45 from where it flows via the driving gas outlet stub pipe 31 and the connecting duct 38, already mentioned and visible in FIG. 2, to the low pressure part 37 of the gas tubine 19.

In a similar manner, the air transfer duct 34 and the corresponding outlet and inlet ports for the air, which flows through the rotor in the opposite direction to the gas, are located in the lower control casing 32, with the difference that the air transfer duct and also the mutually associated outlet and inlet ports are located in different planes and, as already mentioned above, the lower control casing has a correspondingly more complicated shape. The air experiences the last compression stage in the innermost rotor 24 where it emerges in the region of the arrow $Q_A' + Q_A''$ and divides into the quantity $Q_A'$ for the pressure exchanger combustion chamber and the quantity $Q_A''$ for the turbine combustion chamber.

It is not necessary to discuss the bearing and drive arrangements of the rotor here because the designer has available to him, for this purpose, the proven elements and concepts of bearing and drive technology. In order to obtain the greatest possible freedom in the arrangement of the gas turbine and the pressure exchanger relative to one another, it is preferably desirable to attempt to achieve internal drive of the rotors by the driving gases generated in the pressure exchanger combustion chamber 11, for example by cell walls inclined relative to the direction of the rotational axis of the rotor. It would also be possible to use blade rows attached to the rotor shaft outside the rotor casing and subject it to the driving gas $Q_A$ branched off from the main flow and also known electrical, hydraulic and pneumatic driving means. In all cases, even in the case of purely mechanical drive, for example by means of belts, it is necessary to ensure that the rotational speeds of the rotors have a relationship with one another such that the transition of the gas or air flow from one rotor into the next occurs as far as possible without shock and with a continuous change of volume and pressure. The individual rotors therefore accept the same air and gas mass flows. In this ideal case, the speeds would be inversely proportional to the average rotor radii and the lengths of the individual rotors and their cell widths would be proportional to the average rotor radii.

In order to effect the initially mentioned objective of the invention, i.e. a pressure exchanger working cycle advantageous for constant pressure supercharging, the geometrically critical parts of the air and gas side inlet and outlet ports must be so dimensioned that certain disturbing phenomena, which appear in the case of pressure exchangers proposed earlier and in the case of the pressure converter process usual for the supercharging of engines and which make an effective constant pressure process impossible, are avoided.

Reference is first made to a problem which inevitably occurs in conventional pressure exchangers. In the actual application of a pressure exchanger, hot gas expands, i.e. a medium which has a lower density than air of atmospheric pressure, and in the process compresses this cold air of higher density. This pressure exchange is a momentum exchange process in which the density difference between the two media has to be compensated by means of an appropriate velocity difference or by pressure forces which are determined by the casings. Since, however, in the case of pressure exchangers $p_{1U}$ is approximately equal to $p_{1D}$ and $p_{2U}$ is approximately equal to $p_{2D}$, where—as mentioned at the beginning—p represents the pressure and the index "1U" refers to the air inlet (low pressure), "1D" refers to the gas outlet (low pressure), "2U" to the gas inlet (high pressure) and "2D" to the air outlet (high pressure), the velocities at the ends of the charging and scavenging zone are approximately equal, i.e. $u_{1U}$ is approximately equal to $u_{1D}$ and $u_{2U}$ is approximately equal to $u_{2D}$.

In conventional pressure exchangers, therefore, it is necessary to deal with the density induced momentum changes of the air and driving gas by means of pressure forces which are imposed by the casings. In the case of pressure converters, this problem does not usually exist because the pressures and hence the velocities at the two ends of the scavenging and charging zone are substantially different.

Because of these different pressures at the ends of the scavenging and charging zone, however, it is necessary that the scavenging and charging zone should be crossed by at least one compression or expansion wave in each case. For this reason, the media boundaries between the air and driving gas are produced by pressure waves in such cases. Since the density of the driving gas is substantially less than the density of the air, a pressure wave impinging on the media boundary is, to a substantial extent, reflected and the media boundary thus deflected or even turned round. For this reason, precise determination of the pressure wave process is not possible where the media boundary is crossed by pressure waves, "Wandering waves" appear. Furthermore, interactions between the pressure waves and the media boundary lead to very uneven velocity profiles $u_{1D}$ and $u_{2D}$ and also cause a marked increase in the mixing of air and exhaust gas, i.e. a spread of the media separating layer.

Thus in order to obtain a suitable constantpressure pressure exchanger process for the present application, it is important that the pressure waves and the media boundaries should not cross. This is achieved, according to a first variant for designing the ports and closing edges in the two control casings, by observing the geometric parameters for the ports 1U and 1D given in FIG. 5, the casing geometry being, as usual, shown developed in a plane. In this FIG. 5, as already mentioned, 1U signifies the entry port of the low pressure air, 2U the entry port of the high pressure driving gas, 1D the outlet port for the driving gas expanded in the rotor cells of the corresponding compressor stage and 2D the outlet port for the compressed air. L is the rotor width, i.e. also the length of the cell 45. The arrow V indicates the direction of rotation of the rotor.

A fundamental difference between this concept and the geometric relationships is a known proposal for the relative arrangement of the air and gas side control edges consists in the fact that the closing edge 46 of the port 1U coms into contact with a certain cell earlier than the closing edge 47 of 1D. In the earlier proposal mentioned, the reverse is the case; in this case, the closing edge of 1D comes into contact with the appropriate cell earlier than the closing edge of 1U. A compression wave is then initiated from the closing edge 1D and impinges on the closing edge 1U. In the arrangement according to FIG. 5, on the other hand, the wave 52 running from 46 to 47 is an expansion wave.

Figure 5:
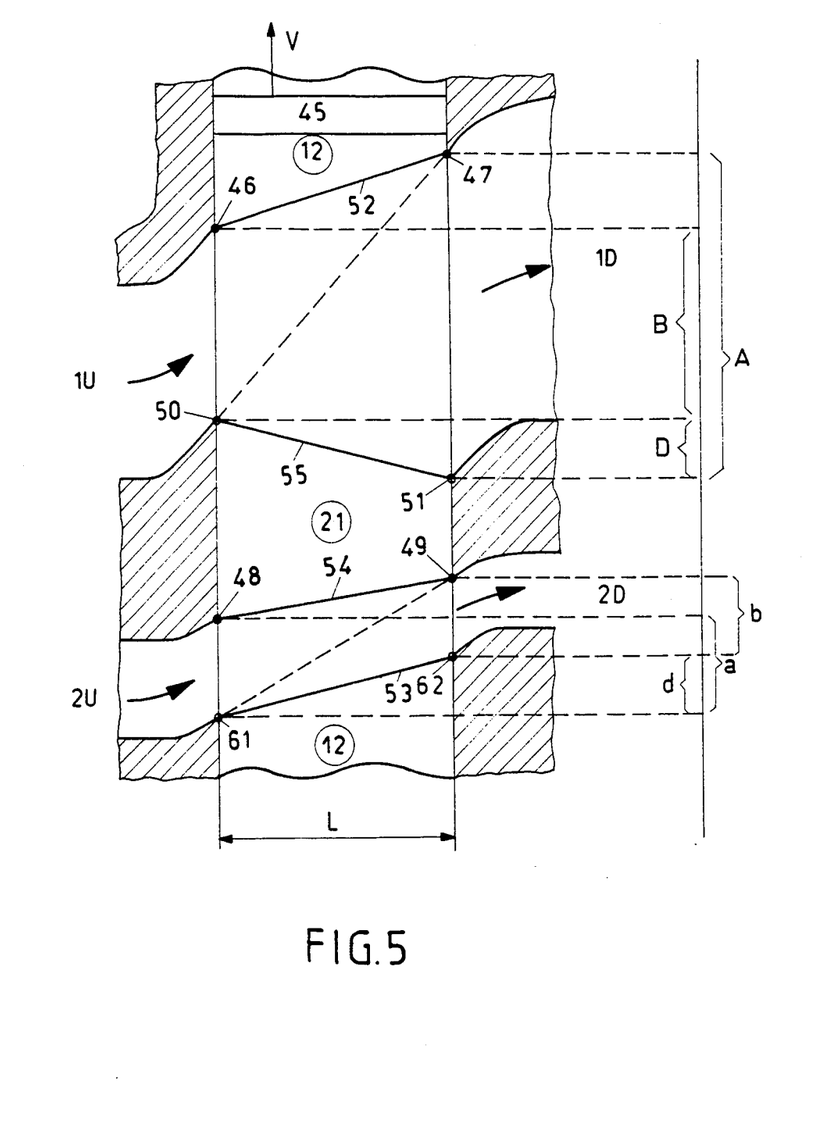

In the casing geometry according to FIG. 5, the closing edges of 2U and 2D are indicated by 48 and 49, respectively and the opening edges of 1U and 1D by 50 and 51, respectively. Putting the distance $51-47=A$, the distance $50-46=B$ and, viewed in the peripheral direction, $51-50=D$, the relationship $A-D>B$ applies for the condition set above that the media boundaries should not be crossed by pressure waves, this has been shown by thorough investigations of possible pressure exchanger cycles.

If this condition is not met, as happens with the geometries proposed earlier, pressure waves must be reflected and they have to cross the media boundaries, thus introducing the abovementioned problems of conventional pressure exchanger cycles. In the earlier proposal mentioned, in which the wave corresponding to the wave 52 is a compression wave, precise investigation shows that no pressure waves should occur in the zones from 2U to 2D, which is of course nonsensical, and the pressure ratio over the waves corresponding to 53, 54 and 55 of FIG. 5 would remain unaltered. The wave 53 is a compression wave, the waves 54 and 55 expansion waves.

The gas dynamic calculation of the pressure exchanger process for the casing geometry of FIG. 5 gives the following geometric matching conditions for the wave propagation times:

$$\text{Wave 53: } \frac{V}{u_s} = \frac{d}{L}, \tag{1}$$

$$\text{Media boundary } 2U - 2D: \frac{V}{u_2} = \frac{b+d}{L}, \tag{2}$$

$$\text{Wave 54: } \frac{2V}{c_{2U} + u_2 + c_{21}} = \frac{b+d-a}{L}, \tag{3}$$

$$\text{Wave 55: } \frac{2V}{c_{21} + c_{1D} - u_1} = \frac{D}{L}, \tag{4}$$

$$\text{Media boundary } 1U - 1D: \frac{V}{u_1} = \frac{A-D}{L}, \tag{5}$$

$$\text{Wave 52: } \frac{2V}{c_{1U} + u_1 + c_{12}} = \frac{A-B-D}{L} \tag{6}$$

where the average propagation time is used for the expansion waves in each case. The relationships (1)–(6) now determine the complete process.

In these:
V is the velocity of the rotor cells relative to the casing,
$u_s$ is the propagation velocity of the shock wave,
u is the relative flow velocity of the media, relative to the cells, at the ends of the charging zone and the scavenging zone, and
c is the sonic velocity, each of the indices applied to these quantities referring to the regions shown in FIG. 5. In this diagram, the designations for the regions 12 and 21 are circled in order to differentiate them from the earlier used reference numbers 12 and 21. Only the index 1 or 2 is used in each case for the quantities which have the same values in the zones 1U and 1D or 2U and 2D.

Figure 6:
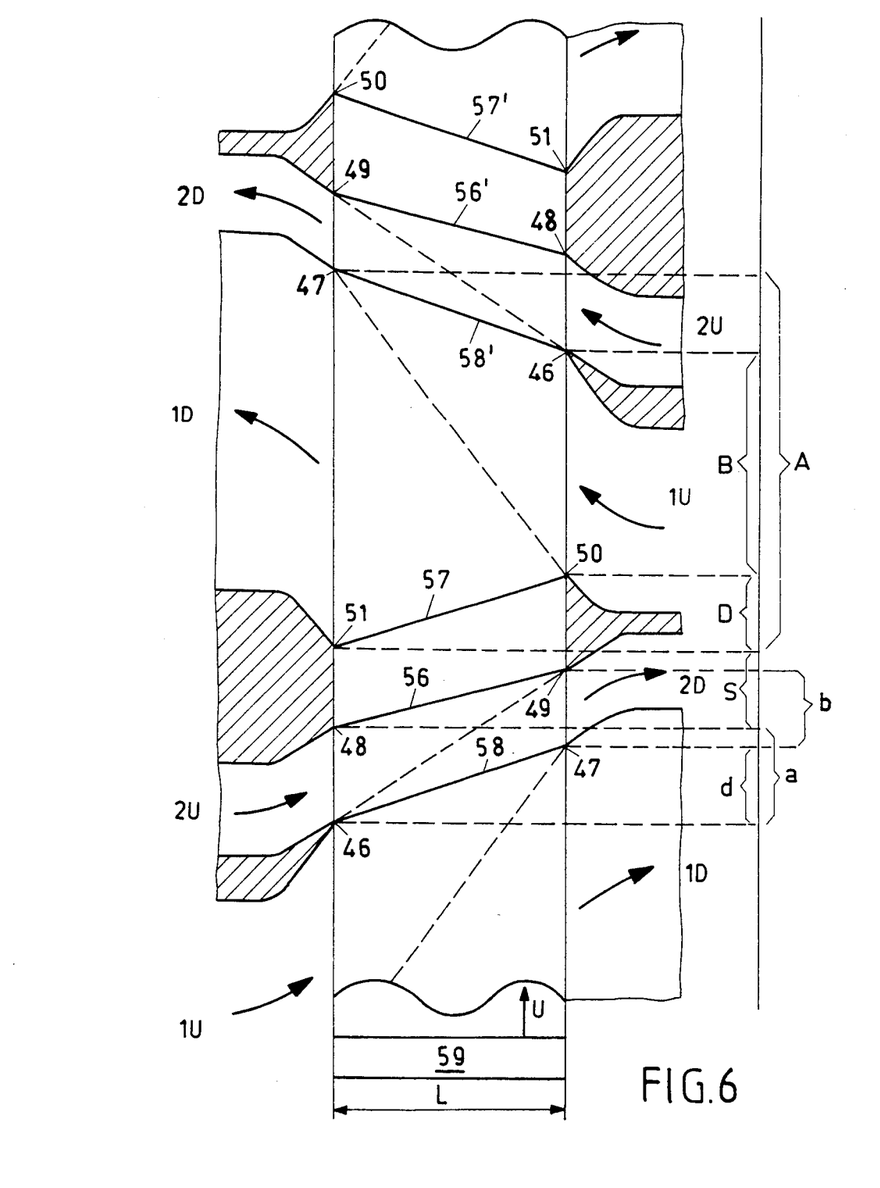
FIG. 6 shows the same for a second, advantageous pressure exchanger cycle according to the invention.

The geometrical quantities in FIGS. 5 and 6 have the following meanings:

A = the length of the low pressure driving gas port 1D,
B = the length of the low pressure air port 1U,
D = the distance between the opening edge 51 of the low pressure driving gas port 1D and the opening edge 50 of the low pressure air port,
S = the land width between 2U and 1D,
a = the length of the high pressure driving gas ports 2U,
b = the length of the high pressure air port 2D, and
d = the length of the high pressure driving gas port 2U.

The velocity parameters in Equations (1)–(6) are obtained from the gas dynamic laws for specified pressure exchanger performance data and the known thermodynamic states of the air and gas. On this matter, reference should be made to the two BBC research reports KLR 79-30B "Theoretische Aspekte des Comprex" (Theoretical Aspects of the Comprex" and KLR 83-194B "Gegenstromdruckwellenmaschine fuer Gasturbinen" (Counterflow Pressure Wave Machine for Gas Turbines), 1979 and 1983, respectively, both by Dr. J. J. Keller.

Although the pressure wave cycle with the casing geometry shown in FIG. 5 is substantially better than previously proposed and practically investigated cycles for the use of a pressure exchanger as the upper stage of a gas turbine, it does have some disadvantages:

The air supplied at 1U is first rarefied by an expansion wave before it is compressed to the pressure $p_2$ by a very strong shock wave.

Wide lands are necessary on the casings. These cause strong heat exchange, unnecessarily high leakage losses and a relatively low power density.

There is no symmetry in terms of the thermal loading on the rotor.

The first disadvantage mentioned can be removed without any change in principle to the cycle. The casing lands which separate the waves 52 and 53 can be replaced by intermediate partitions the width of which is comparable to a cell width. In this case, the expansion wave 52 and the strong compression wave 53 are combined to form a weaker compression wave of pressure ratio $p_2/p_1$. In other words, the air supplied at 1U is not retarded in this case; it is accelerated by the compression wave 53-52 directly from the velocity $u_1$ to the velocity $u_2$.

The other disadvantages are not so easily removed. On this point, it should be noted that the casing land on the entry side (on the left in FIG. 5), which is a boundary of the region 21, plays an important role in the momentum exchange. The need for a pressure force due to the casing can only be avoided if the total exchange of momentum takes place directly between the gas flows. This requirement is satisfied by the casing geometry shown in FIG. 6 for a counterflow cycle. In this case, it should be noted that the casing lands between the waves 56 and 57 (or 56' and 57') can be made arbitrarily narrow. In the limiting case of thin partitions, the expansion waves 56 and 57 are combined to give a simple expansion wave. The counterflow cycle exhibits a further substantial advantage relative to the casing geometry shown in FIG. 5 for the simple cycle. Because the inflow into the cells occurs from alternate sides the boundary layers tend to exhibit a "Stokes character" (in contrast to the "Blasius character" in the case of single-sided inlet flow), so that they should (see the report KLR 79-30B by keller mentioned above) be substantially thinner than in the case of *single-sided inlet flow into the cell rotor*. The calculation of the counterflow cycle agrees to a large extent with the calculation of the simple cycle.

The geometrical matching conditions of the wave propagation times together with the parts determining the geometry, shown in FIG. 6, provide the following expressions for the width of the inlet and outlet openings, referred in each case to the length L of the cells 59:

$$\frac{a}{L} = \frac{V}{u_2} - \frac{2V}{c_{2U} + u_2 + c_{1D} - u_1}, \quad (7)$$

$$\frac{b}{L} = \frac{V}{u_2} - \frac{V}{Mc_{1U} + u_1}, \quad (8)$$

$$\frac{d}{L} = \frac{V}{Mc_{1U} + u_1}, \quad (9)$$

$$\frac{A}{L} = \frac{V}{u_1} + \frac{2V}{c_{2U} + u_2 + c_{1D} - u_1}, \quad (10)$$

$$\frac{B}{L} = \frac{V}{u_1} - \frac{V}{Mc_{1U} + u_1}, \quad (11)$$

and $$\frac{D}{L} = \frac{2V}{c_{2U} + u_2 + c_{1D} - u_1}. \quad (12)$$

Finally, the periodicity condition (cycle closure condition) gives $$a + S + D + B = \pi \cdot R \quad (13),$$

where S is the land width and R is the rotor radius, for which it is appropriate to assume the average radius referred to the rotor cells 59. The above periodicity condition expresses the fact that the inlet openings 1U and 2U and the outlet openings 1D and 2D each occur once around the complete periphery.

In the Equations (7)–(13), $M = (u_5 - u_1)/c_{1U}$, where—as before—$u_1$ and $u_2$ are the relative flow velocities of the two media relative to the cell at the ends of the charging zone and the scavenging zone and $c_{1U}$ is the sonic velocity in 1U. The other velocity parameters correspond to those explained in Equations (1)–(6) and the meaning of the geometric parameters may be seen from FIG. 6.

Figure 7:
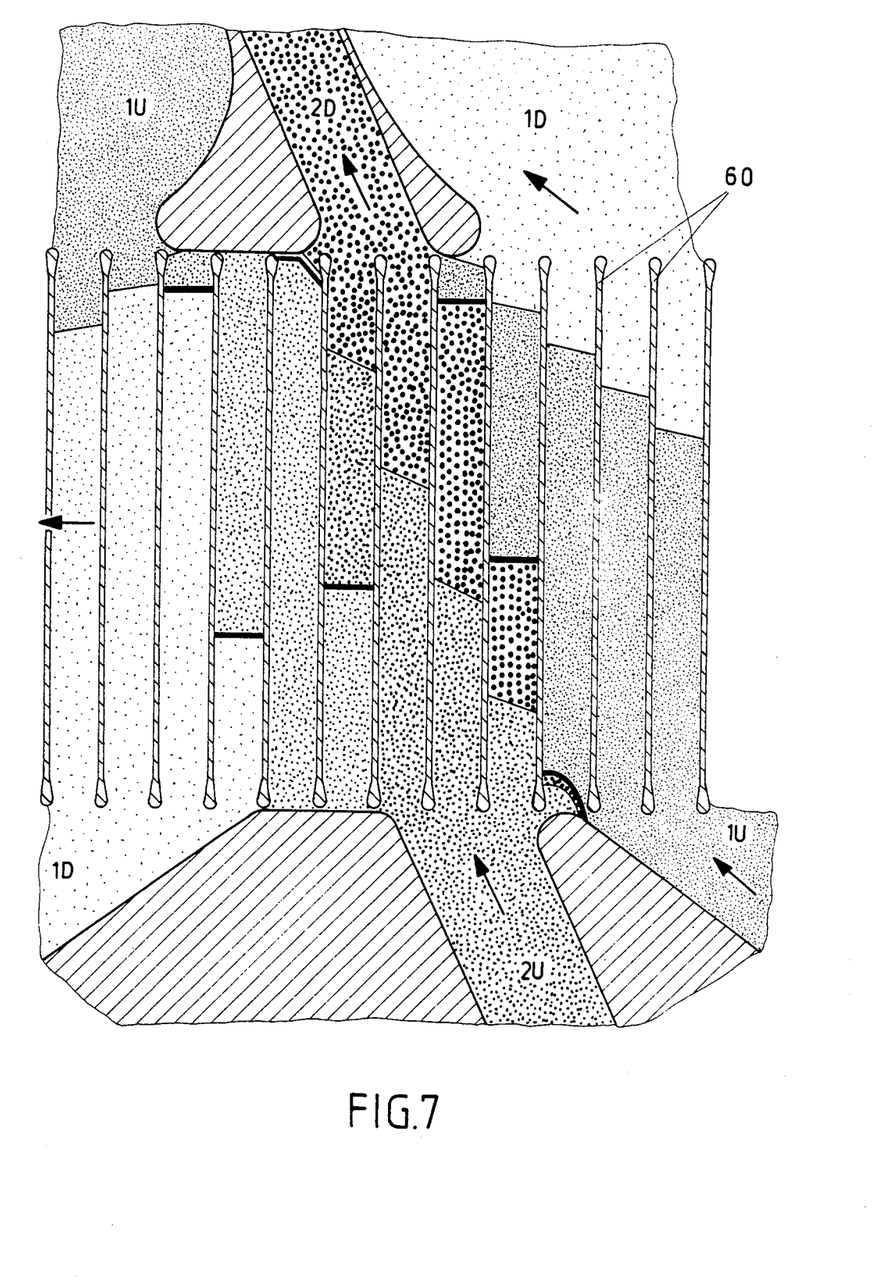
FIG. 7 shows an example of the advantageous design of the cell walls and the casing geometry of a pressure exchanger according to the invention.

FIG. 7 shows a practical arrangement of the ports and cell walls shown schematically in FIG. 6. This arrangement with rounded inlet and outlet parts of the ports and cell walls ensures that detrimental separation of the flow is avoided on these parts. The broad boundary lines 61, which run transverse to the cell walls, represent compression waves and the thin boundary lines 62 represent expansion waves. The variation in the darkness of the shading indicate different density conditions of the driving gas and the air in the regions 2U, 1D and 1U, 2D, respectively. As mentioned in the introduction, 2U indicates the region of the high pressure driving gas, 1D the region of the expanded driving gas, 1U the region of the air at the initial pressure and 2D the region with air compressed to the final pressure.

Earlier measurements on a simple pressure exchanger, intended for a gas turbine locomotive, and published in a BBC Test Report TFVL 1677, gave a proportion of useful air which reached approximately 25–30% of the theoretically possible useful air quantity.

Calculations based on realistic assumptions, on the other hand, indicate that in the case of a counterflow pressure exchanger with the casing geometry according to FIG. 6, taking account of all the losses, the effective air quantity given up by the rotor at 2D would, in the worst case, be 60–70% of the theoretical possible quantity. Also advantageous, relative to the earlier concept mentioned, is the fact that the counterflow pressure exchanger does not require any type of auxiliary in the form of scavenging aids for overcoming the pressure rise; this is because the surplus kinetic energy of the air quantity at 2D is more than sufficient to compensate for all the frictional losses and flow drag effects. Under otherwise identical thermodynamic conditions to the simple pressure exchanger mentioned above, an overall efficiency of approximately 0.41 is obtained for a gas turbine installation with a counterflow pressure exchanger. Using the previously proposed pressure exchanger, on the other hand, it was not possible to substantially improve on the efficiency of conventional gas turbines; the main reason for this may certainly be seen as the casing geometry with the relationship $A - D < B$.

Calculation of the counterflow pressure exchanger cycle shows that the useful air proportion mentioned, N, is critical to the loss proportions in the pressure exchanger process. With increasing N, the overall efficiency of the gas turbine installation also increases. At high N values it is, under certain circumstances, also possible to control the power by the fuel quantities supplied to the turbine combustion chamber alone, without altering the operating conditions of the pressure exchanger combustion chamber and the pressure exchanger itself.

This makes possible an optimum and relatively simple design of the high pressure stage, without compromises, and permits a very high efficiency even during part load operation of the installation.

As stated initially, it is desirable to drive the rotor of the pressure exchanger by means of the gas pressure distribution and to avoid an external mechanical drive.

Corresponding experience with pressure converters shows that free running of the rotor involves no problems. This not only simplifies the design of the pressure exchanger but also simplifies the solution of the sealing problems.

The parts most highly thermally subjected are the pressure exchanger combustion chamber and the inlet duct 2U to the rotor. It is, however, easily possible to utilise an air proportion in excess of the stoichiometric in order to provide satisfactory film cooling of the combustion chamber and tube walls. Furthermore it is quite conceivable and perhaps even desirable to move part of the reaction process into the rotor cells. The pressure exchanger combustion chambers 4 and 11 can therefore be made very compact and located directly before the inlet to 2U.

Particularly in the case of pressure ratios $p_2/p_1 > 2$, an attempt to recover the kinetic energy of the compressed air at 2D by using a subsonic diffuser would hardly be sensible. In terms of efficiency, however, it would be advantageous to fit a Laval nozzle with a critical throat section downstream of the outlet 2D and to retard the flow by means of a shock wave. Provided that such a shock wave does not have a pressure ratio of more than about 2.5–3, this type of kinetic energy recovery may be more favourable from the point of view of efficiency than recovery by means of a subsonic diffuser. In addition, this makes the construction of the pressure exchanger casing simpler and more compact.

When using multi-stage counterflow pressure exchangers in accordance with FIG. 2, in combined installations or jet engines, it would probably be possible to omit the basic installation completely, i.e. to omit the compressor and the low pressure turbine. Although, in the case of a combined installation, the gas turbine installation (consisting of a multi-stage pressure exchanger and a turbine) would have an efficiency which would probably not be substantially higher than the efficiency of a conventional gas turbine. The gas flow released at 1D would be extremely high grade and extremely suitable for the generation of fresh steam for a steam turbine installation. In other words, the exhaust gas entropy conditions would, under certain circumstances, be very favourable. In a jet engine, it would be also possible to do without the turbine because, of course, there would no longer be any compressor to drive. It is, therefore, possible to conceive a jet engine of high efficiency consisting only of a 2-stage or 3-stage pressure exchanger, a combustion chamber and a Laval nozzle, it being possible to use the gas released from the pressure exchanger 1D for a bypass flow insulation.

The arrangements of the control ports shown in FIGS. 5 and 6 could be used without any further modification provided that the temperature ratio of the exhaust gas and air is sufficiently high, i.e. over 3, and the pressure ratio $p_2/p_1$ over one pressure exchanger stage is not made too large, in fact not more than 2. If both limitations are not satisfied, the kinetic energy surplus at 2D is unfavourably high or the low pressure zone 1U−1D is unfavourably wide. This fault can, however, be corrected by selecting a rather higher pressure at 1U than at 1D. In this way, the kinetic energy at 2D can be reduced and the width of the zone 1U−1D reduced. Although stray waves again appear in the low pressure zone in this case, their effects remain comparatively harmless because the velocities in the low pressure region are low and because the multiple reflection in the media boundary does not, in this case, lead to a cumulative acceleration or retardation of the flow.

Figure 8:
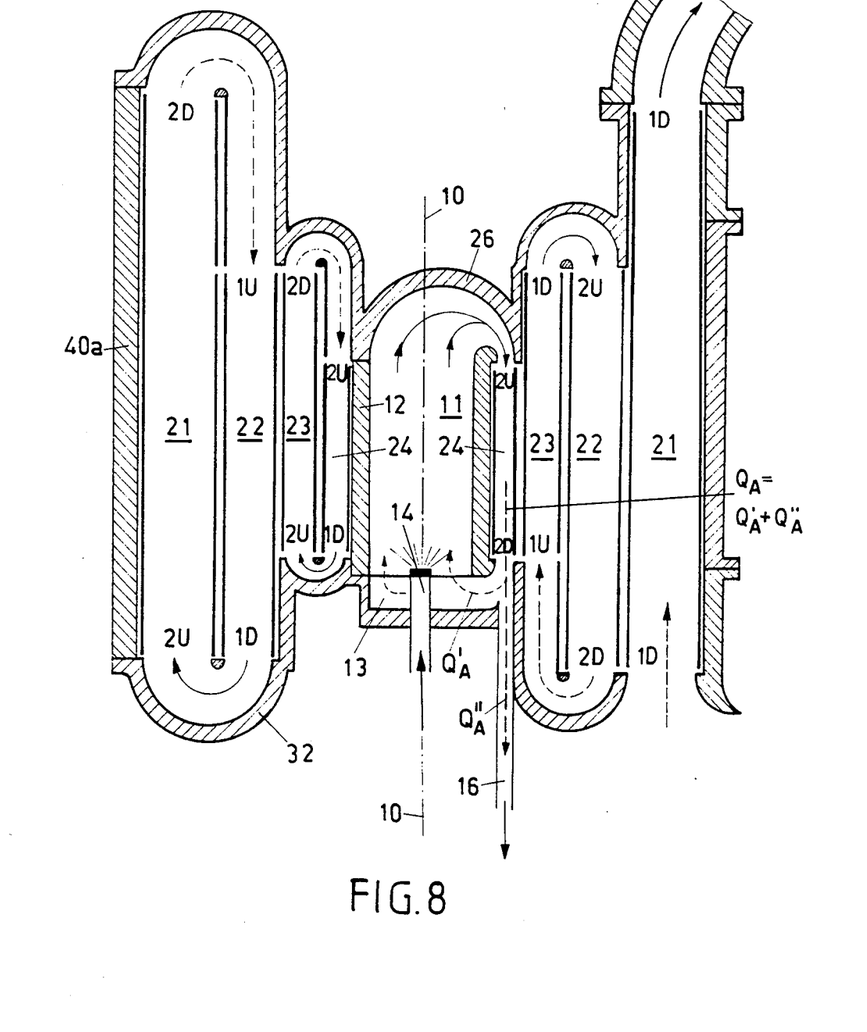
FIG. 8 shows an advantageous variant of the pressure exchanger shown in FIG. 2.

FIG. 8 shows a variant of the pressure exchanger shown interacting with a gas turbine in FIG. 2. The difference relative to the latter is that the pressure exchanger combustion chamber 11 is located approximately at mid-height of the outermost cell rotor 21. Although this complicates the two control casings 26 and 32 because their ducts enter at different planes in both cases, and ducts between the rotors 21-24 are shorter overall, which results in lower flow and heat losses.

We claim:

1. In a pressure wave machine operating as a pressure exchanger, in particular for use as a high pressure compressor for gas turbines, comprising a rotor casing, at least one cell rotor located within the rotor casing, a control casing flanged onto each of the two end faces of the rotor casing, which control casings close off the rotor casing at its two end surfaces, each control casing at the end surfaces of the rotor casing having at least one high pressure driving gas inlet port and one low pressure air inlet port and one low pressure driving gas outlet port and one high pressure air outlet port, respectively, a pressure exchanger combustion chamber for generating high pressure driving gas and connected to the high pressure driving gas port, the pressure exchanger combustion chamber connected to the high pressure air port to which is branched off a part of the high pressure air in the pressure exchanger combustion chamber for burning fuel intended for the pressure exchanger combustion chamber, with the rest of the high pressure air being available for combustion in another combustion chamber, the improvement wherein:

a closing edge of the low pressure air port, as viewed in the direction of rotation of the cell rotor, is located ahead of a closing edge of the low pressure driving gas port, the condition A−D>B applies to the casing geometry, where A is the distance between an opening edge of the low pressure driving gas port and the closing edge of the low pressure driving gas port, D is the distance between the opening edge of the low pressure driving gas port and an opening edge of the low pressure air port, and B is the length of the low pressure air port, the lengths A, B and D being measured in a cylindrical section situated at half the height of the cells, the opening edge of the low pressure driving gas port, as viewed in the direction of the peripheral velocity of the cell rotor, being located ahead of an opening edge of the low pressure air port, the inlet ports for the high pressure driving gas and the low pressure air are located in one of the two control casings, and the outlet ports for the high pressure air and the low pressure driving gas are located in the other casing, the following relationships exist between the length (L) of the cells of the cell rotor, the distance (d) between the opening edge of the high pressure driving gas port and the opening edge of the high pressure air port, the length (a) of the high pressure driving gas port, the length (b) of the high pressure air port, the distance (A) between the opening edge of the low pressure driving gas port and the closing edge of the low pressure driving gas port, the distance (D) between the opening edge of the low pressure driving gas port and the opening edge of the low pressure air port, the length (B) of the low pressure air port and the velocity parameters determining the pressure wave process, said quantities d, a, b, A, D and B being measured in a cylindrical section located at half the height of the cells:

$$\frac{V}{u_s} = \frac{d}{L},$$

$$\frac{V}{u_2} = \frac{b+d}{L},$$

$$\frac{2V}{c_{2U} + u_2 + 21} = \frac{b+d-a}{L},$$

$$\frac{2V}{c_{21} + c_{1D} - u_1} = \frac{D}{L},$$

$$\frac{V}{u_1} = \frac{A-D}{L}, \text{ and}$$

$$\frac{2V}{c_{1U} + u_1 + c_{11}} = \frac{A-B-D}{L}$$

where
  v is the velocity of the rotor cells relative to the casing,
  $u_s$ is the propagation velocity of the shock wave,
  u is the flow velocity of the media, relative to the cells, at the ends of the charging zone and the scavenging zone, and c is the sonic velocity,
where the indices 2U and 1D refer to the high pressure driving gas and the low pressure driving gas, respectively, and the index 1U refers to the low pressure air; furthermore, the indices 1 and 2 refer to low pressure and high pressure, respectively, the index 21 refers to the expansion range of the driving gas and the index 12 refers to the compression range of the air.

2. In a pressure wave machine operating as a counterflow pressure exchanger, in particular for use as a high pressure compressor for gas turbines, comprising a rotor casing, at least one cell rotor located within the rotor casing, a control casing flanged onto each of the two end faces of the rotor casing, which control casings close off the rotor casing at its two end surfaces, each control casing at the end surfaces of the rotor casing having at least one high pressure driving gas inlet port and one low pressure air inlet port and one low pressure driving gas outlet port and one high pressure air outlet port, respectively, a pressure exchanger combustion chamber for generating high pressure driving gas and connected to the high pressure driving gas port, the pressure exchanger combustion chamber connected to the high pressure air port to which is branched off a part of the high pressure air in the pressure exchanger combustion chamber for burning fuel intended for the pressure exchanger combustion chamber, with the rest of the high pressure air being available for combustion in another combustion chamber, the improvement wherein:

- a closing edge of the low pressure air port, as viewed in the direction of rotation of the cell rotor, is located ahead of a closing edge of the low pressure driving gas port,
- the condition $A-D>B$ applies to the casing geometry, where A is the distance between an opening edge of the low pressure driving gas port and the closing edge of the low pressure driving gas port, D is the distance between the opening edge of the low pressure driving gas port and an opening edge of the low pressure air port, and B is the length of the low pressure air port,
    - the lengths A, B and D being measured in a cylindrical section situated at half the height of the cells,
- the opening edge of the low pressure driving gas port, as viewed in the direction of the peripheral velocity of the cell rotor, being located ahead of an opening edge of the low pressure air port,
- both the entry port 2U for the high pressure driving gas and the outlet port 2D for the high pressure air and also the entry duct 1U for the low pressure air and the outlet duct 1D for the low pressure driving gas are, in each case, alternately, located opposite to one another in the control casings in such a way that, as seen in the direction of the peripheral velocity of the cell rotor, said ports 1U, 2U, 1D and 2D follow in series in one control casing, and the ports 1D, 2D, 1U and 2U follow in series in the other control casing,
- the port 1D of the last-mentioned control casing being located opposite to the port 1U of the first-mentioned control casing, the following expressions, referred in each case to the length L of the cells, apply:

$$\frac{a}{L} = \frac{V}{u_2} - \frac{2V}{c_2U + u_2 + c_1D - u_1},$$

$$\frac{b}{L} = \frac{V}{u_2} - \frac{V}{Mc_1U + u_1},$$

$$\frac{d}{L} = \frac{V}{Mc_1U + u_1},$$

$$\frac{A}{L} = \frac{V}{u_1} + \frac{2V}{c_2U + u_2 + c_1D - u_1},$$

$$\frac{B}{L} = \frac{V}{u_1} - \frac{V}{Mc_1U + u_1},$$

$$\frac{D}{L} = \frac{2V}{c_2U + u_2 + c_1D - u_1}$$

and $$a + S + D + B = \pi \cdot R,$$

where S is the land width between the ports 2U and 1D and R is the average radius of rotor cells, and wherein $M=(u_s-u_1)/c_{1U}$, where $u_1$ and $u_2$ are the flow velocities of the two media relative to the cells at the ends of the charging zone and the scavenging zone and $c_{1U}$ is the sonic velocity in 1U.

3. In a pressure wave machine operating as a pressure exchanger, in particular for use as a high pressure driving gas generator for a gas turbine having a high pressure part and a low pressure part, said pressure wave machine comprising a rotor casing, a plurality of rotors located within a common rotor casing, a control casing flanged onto each of the two end faces of the rotor casing, which control casings close off the rotor casing at its two end surfaces, each control casing at the end surfaces of the rotor casing having at least one high pressure driving gas inlet port and one low pressure air inlet port and one low pressure driving gas outlet port and one high pressure air outlet port, respectively, a pressure exchanger combustion chamber for generating high pressure driving gas and connected to the high pressure driving gas port, the pressure exchanger combustion chamber connected to the high pressure air port to which is branched off a part of the high pressure air in the pressure exchanger combustion chamber for burning fuel intended for the pressure exchanger combustion chamber, with the rest of the high pressure air being available for combustion in another combustion chamber, the improvement wherein:

- a closing edge of the low pressure air port, as viewed in the direction of rotation of the cell rotor, is located ahead of a closing edge of the low pressure driving gas port,
- the condition $A-D>B$ applies to the casing geometry, where A is the distance between an opening edge of the low pressure driving gas port and the closing edge of the low pressure driving gas port, D is the distance between the opening edge of the low pressure driving gas port and an opening edge of the low pressure air port, and B is the length of the low pressure air port,
    - the lengths A, B and D being measured in a cylindrical section situated at half the height of the cells,
- the opening edge of the low pressure driving gas port, as viewed in the direction of the peripheral velocity of the cell rotor, being located ahead of an opening edge of the low pressure air port, said rotors comprising coaxial cell rotors with a vertical rotational axis, the rotors supported so as to be rotatable in the same direction in the common rotor casing, said control casings comprising an upper control casing and a lower control casing, within the innermost cell rotor said pressure exchanger combustion chamber having a pressure exchanger burner is located coaxially with the cell rotors, the upper control casing and the lower control casing have transfer ducts, the transfer ducts in the upper control casing connecting the upper end surfaces of the annular cylindrical spaces enclosed by the cell rotors, starting from the pressure exchanger combustion chamber, in such a way that the driving gas generated in the pressure exchanger combustion chamber is deflected from one cell rotor into the next outer cell rotor in each case and is led from the outermost cell rotor into a driving gas outlet stub pipe, which is intended to be connected to the low pressure part of a gas turbine, transfer ports in the lower control casing mutually connect the ends of the annular cylindrical spaces enclosed by the cell rotors, starting from an air induction duct in the region of the outermost cell rotor, in such a way that the air induced through the air induction duct is led from one cell rotor into the next inner cell rotor in each case, and the air compressed to the final pressure is led to a point upstream of the entry side of the pressure exchanger combustion chamber where the air guidance arrangement branches off the air intended for primary combustion in the pressure exchanger air chamber into a pressure exchanger air chamber and branches off the air intended for secondary combustion in a turbine combustion chamber for the high pressure part of the gas turbine into a turbine air duct.

* * * * *